United States Patent
Kurogome et al.

(10) Patent No.: US 12,265,617 B2
(45) Date of Patent: Apr. 1, 2025

(54) LABELING DEVICE AND LABELING PROGRAM

(71) Applicant: NIPPON TELEGRAPH AND TELEPHONE CORPORATION, Tokyo (JP)

(72) Inventors: Yuma Kurogome, Musashino (JP); Makoto Iwamura, Musashino (JP); Jun Miyoshi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 265 days.

(21) Appl. No.: 17/777,999

(22) PCT Filed: Sep. 7, 2020

(86) PCT No.: PCT/JP2020/033818
§ 371 (c)(1),
(2) Date: May 19, 2022

(87) PCT Pub. No.: WO2021/106306
PCT Pub. Date: Jun. 3, 2021

(65) Prior Publication Data
US 2023/0004645 A1    Jan. 5, 2023

(30) Foreign Application Priority Data
Nov. 28, 2019 (WO) .................. PCT/JP2019/046683

(51) Int. Cl.
G06F 21/56    (2013.01)
G06F 18/213   (2023.01)
G06F 18/22    (2023.01)

(52) U.S. Cl.
CPC .......... *G06F 21/561* (2013.01); *G06F 18/213* (2023.01); *G06F 18/22* (2023.01)

(58) Field of Classification Search
CPC ...... G06F 21/561; G06F 21/563; G06F 21/56; G06F 18/22; G06F 18/24; G06F 21/562; G06F 2221/033; G06N 20/00
See application file for complete search history.

(56) References Cited

U.S. PATENT DOCUMENTS

| | | | |
|---|---|---|---|
| 2018/0041536 A1* | 2/2018 | Berlin | H04L 63/1416 |
| 2021/0141897 A1* | 5/2021 | Seifert | G06F 21/561 |
| 2023/0342462 A1* | 10/2023 | Ducau | G06N 3/08 |

FOREIGN PATENT DOCUMENTS

| | | | | |
|---|---|---|---|---|
| CN | 104640105 A | * | 5/2015 | ........... G06F 21/561 |
| CN | 108256325 A | * | 7/2018 | ........... G06F 21/561 |

(Continued)

OTHER PUBLICATIONS

B. Sun, Q. Li, Y. Guo, Q. Wen, X. Lin and W. Liu, "Malware family classification method based on static feature extraction," 2017 3rd IEEE International Conference on Computer and Communications (ICCC), Chengdu, China, 2017, pp. 507-513 (Year: 2017).*

(Continued)

*Primary Examiner* — Zhimei Zhu
(74) *Attorney, Agent, or Firm* — XSENSUS LLP

(57) ABSTRACT

A labeling apparatus includes processing circuitry configured to extract a feature of malware to be labeled and features of a malware group with a known label, and identify malware or a malware group with a feature among the features of the malware group that is most similar to the feature of the malware to be labeled based on a degree of similarity between the feature of the malware to be labeled and each of the features of the malware group extracted, and give a label that has been given to the malware or the malware group to the malware to be labeled.

12 Claims, 5 Drawing Sheets

(56) References Cited

FOREIGN PATENT DOCUMENTS

| CN | 108280350 A | * | 7/2018 | ........... | G06F 21/563 |
| CN | 109359274 A | * | 2/2019 | ........... | G06F 40/126 |

OTHER PUBLICATIONS

S.-H. Zhang, C.-C. Kuo and C.-S. Yang, "Static PE Malware Type Classification Using Machine Learning Techniques," 2019 International Conference on Intelligent Computing and its Emerging Applications (ICEA), Tainan, Taiwan, 2019, pp. 81-86 (Year: 2019).*
Sebastián et al., "AVclass: A Tool for Massive Malware Labeling". In Proceedings of the 19th International Symposium on Research in Attacks, Intrusions and Defenses (RAID'16). 2016, pp. 230-253.
Anderson et al., "EMBER: An Open Dataset for Training Static PE Malware Machine Learning Models", CoRR, abs/1804.04637, arXiv:1804.04637v2, Apr. 16, 2018, 8 pages.
Zhu et al., "Learning from Labeled and Unlabeled Data with Label Propagation", Technical Report CMU-CALD-02-107, Carnegie Mellon University, 2002, 8 pages.
Kurogome et al., "AVCLASS++: Yet Another Massive Malware Labeling Tool", Black Hat Europe 2019 Arsenal, Available Online At: https://www.blackhat.com/eu-19/arsenal/schedule/index.html, Dec. 4, 2019, 23 pages.
Kurogome et al., "AVCLASS++" Available Online At: GitHub Pages: https://github.com/killvxk/avclassplusplus/blob/da2888ea86f65895afc4bffbdb906cdb6b7a36c2/README.md, Nov. 13, 2019, pp. 1-15.
Horiai et al., "Automatic Malware Variant Classification by Hamming Distance", IPSJ SIG Technical Report, 2008-CSEC-41 (11), May 23, 2008, pp. 61-66 (6 pages Including English Abstract).

* cited by examiner

LABELING DEVICE AND LABELING PROGRAM

CROSS-REFERENCE TO RELATED APPLICATIONS

The present application is based on PCT filing PCT/JP2020/033818, filed Sep. 7, 2020, which claims priority to PCT/JP2019/046683, filed Nov. 28, 2019, the entire contents of each are incorporated herein by reference.

TECHNICAL FIELD

The present disclosure relates to a labeling apparatus and a labeling program.

BACKGROUND ART

Labels for malware are used in creating datasets to be used when malware is to be classified. As such labels, detection names created by antivirus software (hereinafter referred to as an "antivirus") may be used. In this case, one label is given to one piece of malware.

There are samples of malware that are difficult for a certain antivirus to label. To deal with such a situation, there is an approach called AVCLASS in which one or more label candidates are listed using antiviruses of multiple companies to generate and give a label obtained by normalizing and aggregating the candidates.

CITATION LIST

Non Patent Literature

NPL 1: Marcos Sebastian, Richard Rivera, Platon Kotzias, and Juan Caballero. 2016. "AVclass: A Tool for Massive Malware Labeling". In Proceedings of the 19th International Symposium on Research in Attacks, Intrusions and Defenses (RAID'16). 230-253.
NPL 2: Hyrum S. Anderson and Phil Roth. 2018. "EMBER: An Open Dataset for Training Static PE Malware Machine Learning Models", CoRR, abs/1804.04637.
NPL 3: Xiaojin Zhu and Zoubin Ghahramani, 2002. "Learning from Labeled and Unlabeled Data with Label Propagation", Technical Report CMU-CALD-02-107, Carnegie Mellon University.

SUMMARY OF THE INVENTION

Technical Problem

The techniques in the related art sometimes cannot properly label malware. For example, because the approach AVCLASS described above is based on the premise that label candidates are generated, malware would not be labeled if no label candidate is output. Further, in a case in which random character strings automatically generated by antiviruses are included as labels in label candidates, a useful label may not be given.

Means for Solving the Problem

In order to solve the above-described problem and achieve the objective, a labeling apparatus according to the present disclosure includes: processing circuitry configured to: extract a feature of malware to be labeled and features of a malware group with a known label; and identify malware or a malware group with a feature among the features of the malware group that is most similar to the feature of the malware to be labeled based on a degree of similarity between the feature of the malware to be labeled and each of the features of the malware group extracted, and give a label that has been given to the malware or the malware group to the malware to be labeled.

Effects of the Invention

According to the present disclosure, it is possible to exhibit the effect that a label can be appropriately given to malware even when there are no label candidates.

DESCRIPTION OF EMBODIMENTS

Embodiments of a labeling apparatus and a labeling program according to the present application will be described below in detail with reference to the drawings. Further, the labeling apparatus and labeling program according to the present application are not limited to the embodiments.

First Embodiment

Figure 1:
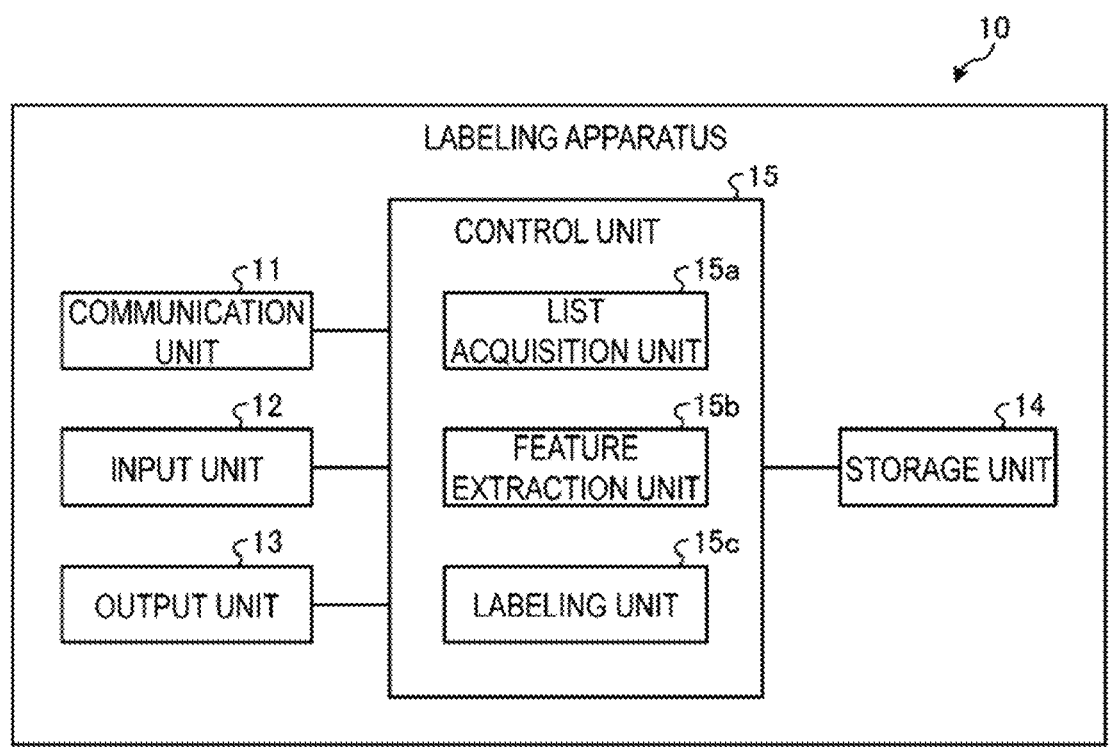
FIG. 1 is a diagram illustrating an example of a configuration of a labeling apparatus according to a first embodiment.

In the following embodiment, a configuration of a labeling apparatus 10 and a flow of processing of the labeling apparatus 10 according to a first embodiment will be described in order, and finally effects of the first embodiment will be described.
Configuration of Labeling Apparatus
First, a configuration of the labeling apparatus 10 will be described using FIG. 1. FIG. 1 is a diagram illustrating an example of a configuration of the labeling apparatus according to the first embodiment. The labeling apparatus 10 is an apparatus that automatically gives a label to a sample whose label is unknown, with reference to a sample group of malware with known labels. Further, a malware group (sample group) with known labels is not limited to a malware group in which each piece of the malware has a unique label, and a plurality of pieces of malware with the same label may be included in the group.

The labeling apparatus 10 includes a communication unit 11, an input unit 12, and an output unit 13, a storage unit 14, and a control unit 15 as illustrated in FIG. 1. Each of the units will be described below.

The communication unit 11 is a communication interface on which various types of information are transmitted and/or received to and/or from another apparatus connected via a network or the like. The communication unit 11 is realized by a network interface card (NIC) or the like and enables the control unit 15 to communicate with another apparatus via an electrical communication line such as a local area network (LAN) or the Internet.

The input unit 12 is realized using an input device such as a keyboard or a mouse and inputs various types of instruction information such as instruction information for starting processing to the control unit 15 in response to an operation input by an operator. The output unit 13 is realized by a display device such as a liquid crystal display or a printing device such as a printer.

The storage unit 14 is realized by a semiconductor memory element such as a random access memory (RAM) or a flash memory or a storage device such as a hard disk or an optical disc, and stores a processing program for causing the labeling apparatus 10 to operate, data to be used during execution of the processing program, and the like.

The control unit 15 includes an internal memory for storing a program and required data that define various processing procedures and the like and executes various types of processing using the program and the data. For example, the control unit 15 is an electronic circuit such as a central processing unit (CPU) or a micro processing unit (MPU). The control unit 15 includes a list acquisition unit 15a, a feature extraction unit 15b, and a labeling unit 15c.

The list acquisition unit 15a acquires a label candidate list created for malware, and identifies malware of the label candidate list as malware to be labeled when the acquired label candidate list is empty.

Figure 2:
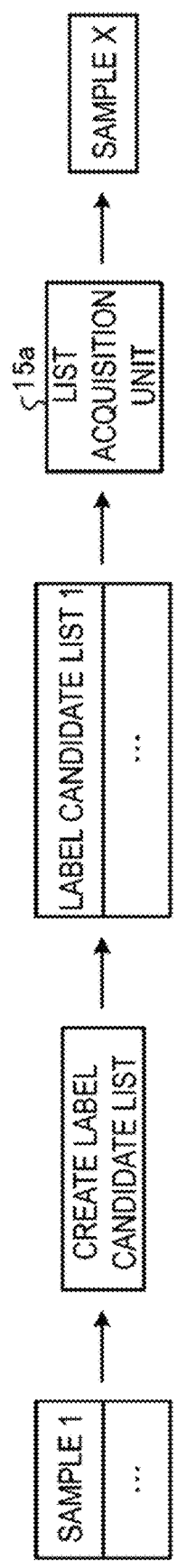
FIG. 2 is a diagram describing an overview of processing by a list acquisition unit.

Here, an overview of processing by the list acquisition unit 15a will be described using FIG. 2. FIG. 2 is a diagram describing an overview of processing by the list acquisition unit. The list acquisition unit 15a acquires label candidate lists created for a plurality of malware samples as illustrated in FIG. 2. Further, processing to create the label candidate lists may be performed by an external apparatus or the labeling apparatus 10 using an existing method.

Then, upon acquiring the label candidate lists, the list acquisition unit 15a investigates whether there are one or more label candidates on each label candidate list. That is, the list acquisition unit 15a investigates whether each label candidate list is empty. Next, if a label is included in the label candidate lists, the list acquisition unit 15a determines whether the label is a randomly generated character string, and if the label is determined to be a randomly generated character string, the label of the character string is excluded. For example, the list acquisition unit 15a calculates an index "N-gram normality score" or "Meaningful characters ratio" of each label candidate included in each label candidate list to evaluate whether the character string is a random character string, and excludes a label whose calculated index value is below a certain threshold from the candidate list.

In other words, the list acquisition unit 15a excludes a label of a random character string as a useless label candidate among the label candidates included in the acquired label candidate lists. To describe using a specific example, the list acquisition unit 15a acquires a label candidate list including, for example, "MmNfrHgm40bj1", "Trojan.MmNfrHgm40bj1", and "Olympus" as label candidates. Here, it is assumed that "MmNfrHgm40bj1" and "Trojan.MmNfrHgm40bj1" are randomly generated character strings, and only "Olympus" is a useful label. Thus, the list acquisition unit 15a uses an index such as "N-gram normality score" or "Meaningful characters ratio" to determine whether the label is a randomly generated character string, and if the label is determined to be a randomly generated character string, the label of the character string is excluded as a useless label candidate. Further, an index such as "N-gram normality score" or "Meaningful characters ratio" is to identify whether a given character string is constituted by a sequence of letters that are often found in English words. Using this index, it is possible to determine, for example, that "MmNfrHgm40bj1" is a random character string, and "Olympus" is not a random character string.

In addition, in a case in which there is an empty label candidate list with no label candidates, the list acquisition unit 15a identifies a malware sample X of the label candidate list as a malware sample to be labeled.

Returning to the description of FIG. 1, the feature extraction unit 15b extracts a feature of the malware to be labeled and features of the malware group with known labels. In addition, the feature extraction unit 15b also converts features extracted from the malware to be labeled and the malware group with known labels into feature vectors.

For example, the feature extraction unit 15b extracts features such as "Byte histogram", "printable strings", "file size," "PE headers", "sections", "imports", "exports", and the like from the malware to be labeled and the malware group with known labels. In addition, the feature extraction unit 15b then converts the extracted features into vectors.

The labeling unit 15c identifies malware or a malware group with a feature among the features of the malware group with known labels that is most similar to the feature of the malware to be labeled based on degrees of similarity between the feature of the malware to be labeled and the features of the malware group with known labels extracted by the feature extraction unit 15b. Then, the labeling unit 15c gives the label that has been given to the malware or the malware group to the malware to be labeled.

Specifically, the labeling unit 15c calculates the degree of similarity between the feature vector of the malware to be labeled and each feature vector of the malware group with known labels converted by the feature extraction unit 15b. Then, the labeling unit 15c identifies malware or a malware group with a feature vector having the highest degree of similarity among the feature vectors of the malware group with known labels, and gives the label that has been given to the malware or the malware group to the malware to be labeled. Further, any known method may be used as a method of calculating a degree of similarity.

For example, the labeling unit 15c may create a graph in which the feature vectors of the malware group with known labels and the feature vector of the malware to be labeled are nodes and degrees of similarity between the nodes are weights for edges. In addition, the labeling unit 15c may propagate a label along the weights from a nearby node to which the node of the malware to be labeled is connected (e.g., NPL 3 described above). In other words, the labeling unit 15c gives the label of the node of the most similar feature vector to the malware to be labeled.

Figure 3:
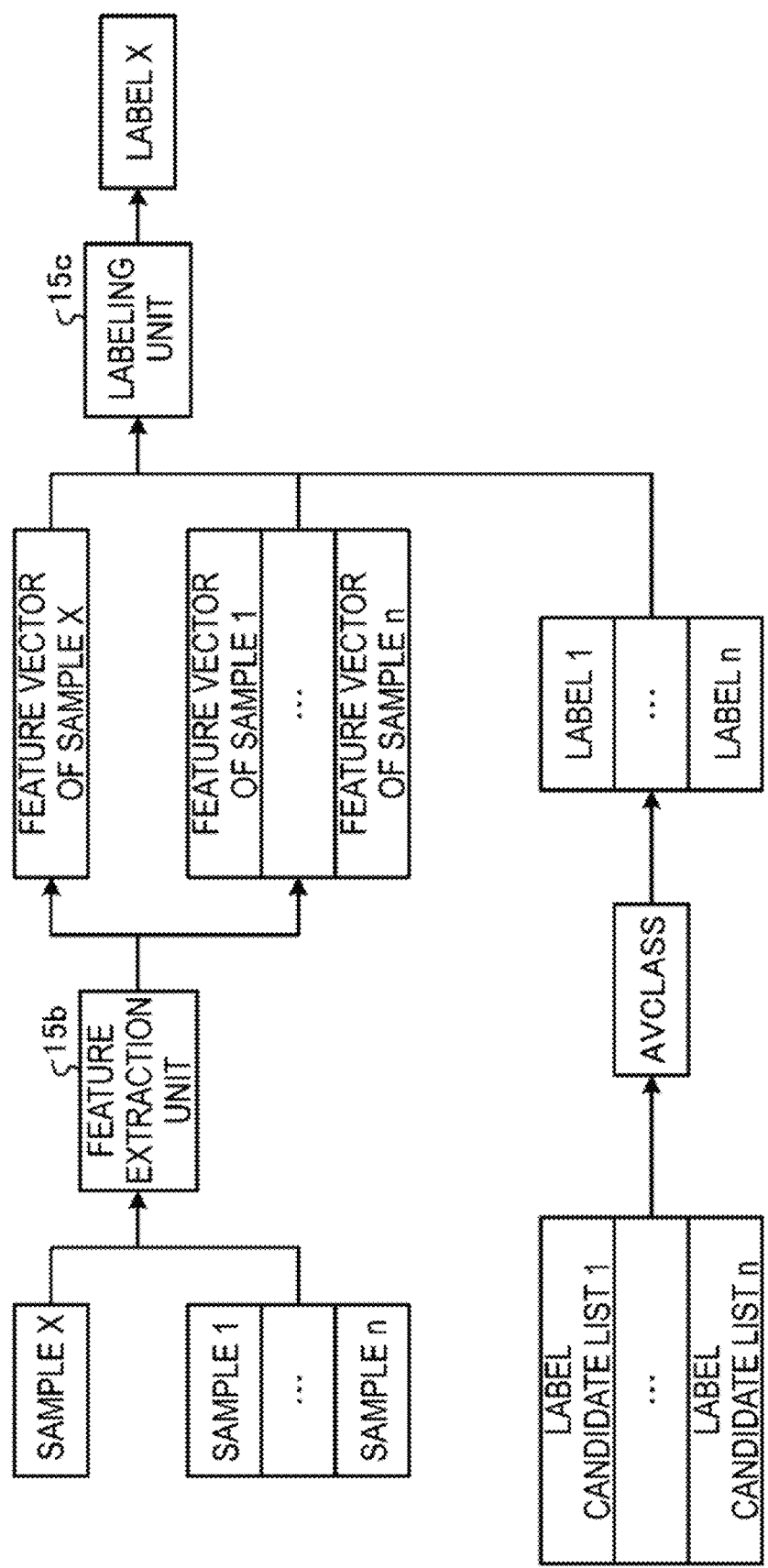
FIG. 3 is a diagram describing an overview of processing by a feature extraction unit and a labeling unit.

Here, an overview of processing by the feature extraction unit 15b and the labeling unit 15c will be described using FIG. 3. FIG. 3 is a diagram describing an overview of processing by the feature extraction unit and the labeling unit. The feature extraction unit 15b receives, as an input, a file of an sample X of the malware to be labeled and a file group of samples 1 to n of the malware with known labels as illustrated in FIG. 3. Then, the feature extraction unit 15b outputs the feature vector of the sample X and the feature vectors of the samples 1 to n to the labeling unit 15c.

The labeling unit 15c receives the input of the feature vector of the sample X and the feature vectors of the samples 1 to n from the feature extraction unit 15b. The labeling unit 15c also receives the input of the labels of the samples 1 to n generated from the label candidate list by AVCLASS.

Further, processing to generate the labels of the samples 1 to n from the label candidate list using AVCLASS may be performed by an external apparatus or the labeling apparatus 10 using an existing method.

The labeling unit 15c calculates degrees of similarity between the feature vector of the sample X and the feature vectors of the samples 1 to n, identifies a sample or a sample group with a feature vector having the highest degree of similarity among the feature vectors of the samples 1 to n, and gives the label that has been given to the sample to the malware of the sample X.

In this manner, the labeling apparatus 10 compares the feature of the file of the sample X with the features of the file group of the samples 1 to n of the malware that already has been labeled when the detection name candidate list for a certain sample X is empty, and gives the label that has been given to similar malware to the malware of the sample X.

Processing Procedure of Labeling Apparatus

Figure 4:
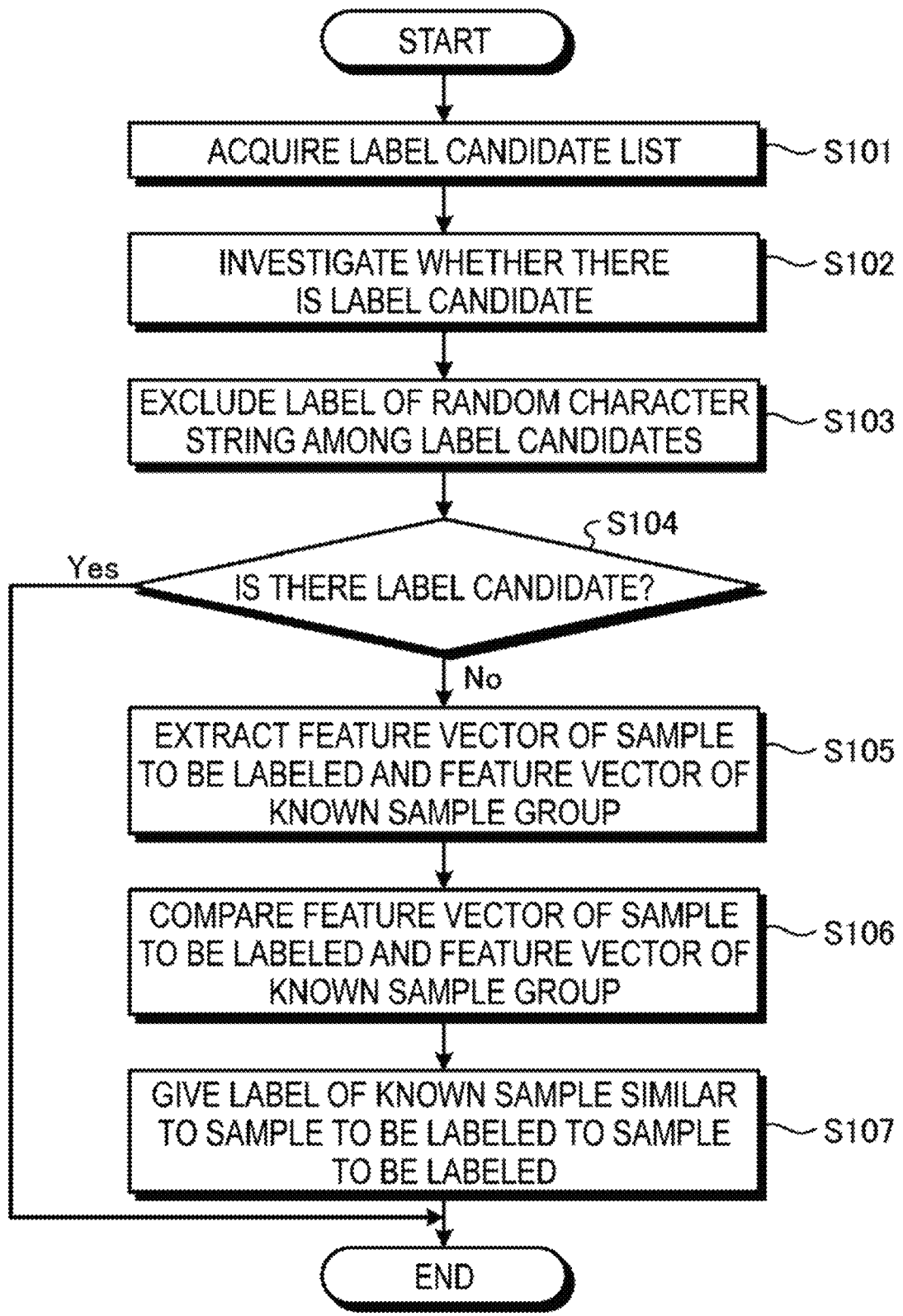
FIG. 4 is a flowchart showing an example of labeling processing by the labeling apparatus according to the first embodiment.

Next, an example of a processing procedure performed by the labeling apparatus 10 according to the first embodiment will be described using FIG. 4. FIG. 4 is a flowchart showing an example of labeling processing by the labeling apparatus according to the first embodiment.

The list acquisition unit 15a of the labeling apparatus 10 acquires label candidate lists created for malware (step S101), and investigates whether each label candidate list has one or more label candidates (step S102) as illustrated in FIG. 4.

Next, the list acquisition unit 15a excludes a label of a random character string among the label candidates included in the acquired label candidate list (step S103). Specifically, the list acquisition unit 15a calculates an index value for evaluating whether each label candidate included in the character string of each label candidate list is a random character string, and excludes a label with an index value that is below a certain threshold from the candidate list. Then, if there are one or more label candidates in all of the label candidate lists as a result of performing the investigation (step S104; positive), the list acquisition unit 15a terminates the processing as is. That is, the labeling apparatus 10 can generate labels from the label candidate list with the existing AVCLASS for labeling.

On the other hand, if the list acquisition unit 15a determines that there are no label candidates in the label candidate lists (step S104; negative), the feature extraction unit 15b extracts a feature vector of the sample to be labeled and feature vectors of the known sample group (step S105).

Then, the labeling unit 15c compares the feature vector of the sample to be labeled with the feature vectors of the known sample group (step S106), and gives a label of the known sample (or sample group) that is similar to the sample to be labeled to the sample to be labeled (step S107).

Effects of First Embodiment

The labeling apparatus 10 according to the first embodiment extracts the features of the malware to be labeled and features of the malware group with known labels. Then, the labeling apparatus 10 identifies malware or a malware group with a feature among the features of the malware group that is most similar to the feature of the malware to be labeled based on the degrees of similarity between the extracted features of the malware to be labeled and features of the malware group. Then, the labeling apparatus 10 gives the label that has been given to the malware or the malware group to the malware to be labeled. Thus, the labeling apparatus 10 exhibits the effect that a label can be appropriately given to the malware even when there is no label candidate.

That is, the labeling apparatus 10 has the effect that, as a label to be given to malware, a label of existing malware having features similar to that of the aforementioned malware can be given to the malware and used to generate a dataset. Furthermore, because the labeling apparatus 10 gives the label of the malware group to other malware, it is possible to exhibit the effect that effort to give labels to malware one at a time is not required.

In addition, because the labeling apparatus 10 excludes labels of random character strings among the label candidates included in the label candidate lists, it is possible to exclude useless label candidates, and as a result, to increase accuracy in labeling.

System Configuration, Etc.

In addition, constituent components of each device illustrated in the drawings are functionally conceptual and are not necessarily physically configured as illustrated in the drawings. That is, the specific aspects of distribution and integration of the devices are not limited to those illustrated in the diagrams, and all or some of the devices may be distributed or integrated functionally or physically in desired units depending on various kinds of loads, states of use, and the like. Further, all or some of the processing functions performed by each device can be realized by a CPU and a program analyzed and executed by the CPU or realized as hardware with wired logic.

In addition, all or some of the processing operations described as being automatically performed among the processing operations described in the present embodiment may be performed manually, or all or some of the processing operations described as being manually performed may be performed automatically using a known method. Further, the processing procedures, the control procedures, the specific names, and information including various data and parameters described in the specification or shown in the drawings may be arbitrarily changed except for cases as specified.

Program

Figure 5:
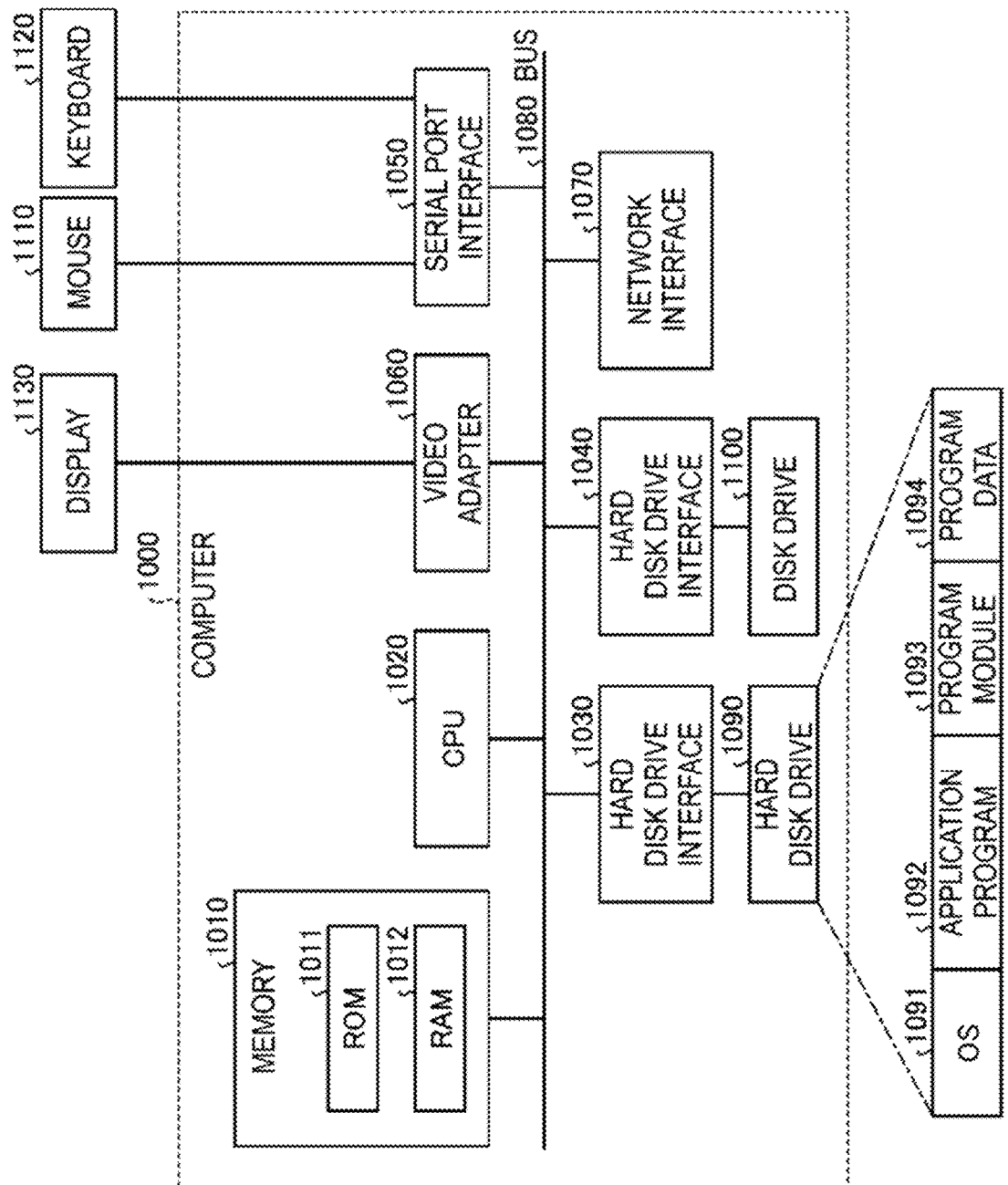
FIG. 5 is a diagram illustrating a computer that executes a labeling program.

FIG. 5 is a diagram illustrating a computer that executes a labeling program. The computer 1000 has, for example, a memory 1010 and a CPU 1020. The computer 1000 has a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium, for example, a magnetic disk or an optical disc is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. That is, a program defining each processing of the labeling apparatus 10 is mounted as the program module 1093 in which a computer executable code is written. The program module 1093 is stored in, for example, the hard disk drive 1090. For example, the program module 1093 for executing the same processing as that performed by the functional configuration in the apparatus is stored in the hard disk drive 1090. Meanwhile, the hard disk drive 1090 may be replaced with a solid state drive (SSD).

In addition, data used for the processing of the above-described embodiment is stored in, for example, the memory 1010 or the hard disk drive 1090 as the program data 1094. In addition, the CPU 1020 reads out and executes the program module 1093 and the program data 1094 stored in the memory 1010 and the hard disk drive 1090, as necessary, in the RAM 1012.

Further, the program module 1093 and the program data 1094 are not necessarily stored in the hard disk drive 1090, and may be stored in, for example, a removable storage medium and be read by the CPU 1020 through the disk drive 1100 or the like. Alternatively, the program module 1093 and the program data 1094 may be stored in another computer connected through a network or a WAN. In addition, the program module 1093 and the program data 1094 may be read by the CPU 1020 from another computer connected via a network interface 1070.

REFERENCE SIGNS LIST

- 10 Labeling apparatus
- 11 Communication unit
- 12 Input unit
- 13 Output unit
- 14 Storage unit
- 15 Control unit
- 15a List acquisition unit
- 15b Feature extraction unit
- 15c Labeling unit

The invention claimed is:

1. A labeling apparatus comprising:
   processing circuitry configured to:
   extract a feature of malware to be labeled and features of a malware group with a known label; and
   identify malware or a malware group with a feature among the features of the malware group that is most similar to the feature of the malware to be labeled based on a degree of similarity between the feature of the malware to be labeled and each of the features of the malware group extracted, and give a label included in the malware or the malware group to the malware to be labeled,
   wherein the processing circuitry is further configured to:
   acquire a label candidate list created for malware and identify malware of the label candidate list as the malware to be labeled when the acquired label candidate list is empty,
   extract a feature of the malware to be labeled identified and the features of the malware group, and
   acquire the label candidate list, and, when a label is included in the acquired label candidate list, determine whether the label is of a randomly generated character string, exclude the label of the character string when it is determined that the label is of a randomly generated character string, and identify the malware of the label candidate list as the malware to be labeled when the acquired label candidate list is empty.

2. The labeling apparatus according to claim 1, wherein the processing circuitry is further configured to:
   convert the extracted feature of the malware to be labeled into a feature vector of the malware to be labeled and convert the extracted features of the malware group into feature vectors of the malware group, and
   calculate a degree of similarity between the feature vector of the malware to be labeled and each of the feature vectors of the malware group converted, identify the malware or the malware group with a feature vector having a highest degree of similarity among the feature vectors of the malware group, and give the label included in the malware or the malware group to the malware to be labeled.

3. The labeling apparatus according to claim 2, wherein the processing circuitry is further configured to create a graph in which the feature vector of malware to be labeled and the feature vector of the malware group are nodes, and degrees of similarity between the nodes are weights for edges.

4. The labeling apparatus according to claim 3, wherein the circuitry is further configured to propagate a label along weights of a node connected to a node corresponding to the feature vector of the malware to be labeled.

5. The labeling apparatus according to claim 1, wherein the feature of the malware includes at least one of a byte histogram, printable strings, file size, PE headers, imports, exports, and sections of the malware.

6. A non-transitory computer-readable recording medium storing therein a labeling program that causes a computer to execute a process comprising:
   extracting a feature of malware to be labeled and features of a malware group with a known label; and
   identifying malware or a malware group with a feature among the features of the malware group that is most similar to the feature of the malware to be labeled based on a degree of similarity between the feature of the malware to be labeled and each of the features of the malware group extracted, and giving a label included in the malware or the malware group to the malware to be labeled,
   wherein the process further comprises:
   acquiring a label candidate list created for malware and identify malware of the label candidate list as the malware to be labeled when the acquired label candidate list is empty,
   extracting a feature of the malware to be labeled identified and the features of the malware group, and
   acquiring the label candidate list, and, when a label is included in the acquired label candidate list, determine whether the label is of a randomly generated character string, excluding the label of the character string when it is determined that the label is of a randomly generated character string, and identifying the malware of the label candidate list as the malware to be labeled when the acquired label candidate list is empty.

7. The non-transitory computer-readable recording medium according to claim 6, wherein
   the extracted feature of the malware to be labeled is converted into a feature vector of the malware to be labeled and the extracted features of the malware group are converted into feature vectors of the malware group, and
   a degree of similarity between the feature vector of the malware to be labeled and each of the feature vectors of the malware group converted is calculated, the malware or the malware group with a feature vector having a highest degree of similarity among the feature vectors of the malware group is identified, and the label included in the malware or the malware group is given to the malware to be labeled.

8. A labeling method executed by a labeling apparatus, the labeling method comprising:
   extracting a feature of malware to be labeled and features of a malware group with a known label; and identifying malware or a malware group with a feature among the features of the malware group that is most similar to the feature of the malware to be labeled based on a degree of similarity between the feature of the malware to be labeled and each of the features of the malware group extracted, and giving a label included in the malware or the malware group to the malware to be labeled, wherein the method further comprises:

acquiring a label candidate list created for malware and identify malware of the label candidate list as the malware to be labeled when the acquired label candidate list is empty, extracting a feature of the malware to be labeled identified and the features of the malware group, and acquiring the label candidate list, and, when a label is included in the acquired label candidate list, determine whether the label is of a randomly generated character string, excluding the label of the character string when it is determined that the label is of a randomly generated character string, and identifying the malware of the label candidate list as the malware to be labeled when the acquired label candidate list is empty.

9. The labeling method according to claim 8, wherein the extracted feature of the malware to be labeled is converted into a feature vector of the malware to be labeled and the extracted features of the malware group are converted into feature vectors of the malware group, and a degree of similarity between the feature vector of the malware to be labeled and each of the feature vectors of the malware group converted is calculated, the malware or the malware group with a feature vector having a highest degree of similarity among the feature vectors of the malware group is identified, and the label included in the malware or the malware group is given to the malware to be labeled.

10. The labeling method according to claim 9, further comprising:

creating a graph in which the feature vector of malware to be labeled and the feature vector of the malware group are nodes, and degrees of similarity between the nodes are weights for edges.

11. The labeling method according to claim 10, further comprising:

propagating a label along weights of a node connected to a node corresponding to the feature vector of the malware to be labeled.

12. The labeling method according to claim 8, wherein the feature of the malware includes at least one of a byte histogram, printable strings, file size, PE headers, imports, exports, and sections of the malware.

* * * * *